March 15, 1955  F. H. LOTT  2,704,319
ELECTRICALLY HEATED LUNCH PAIL
Filed Sept. 29, 1954  2 Sheets-Sheet 1
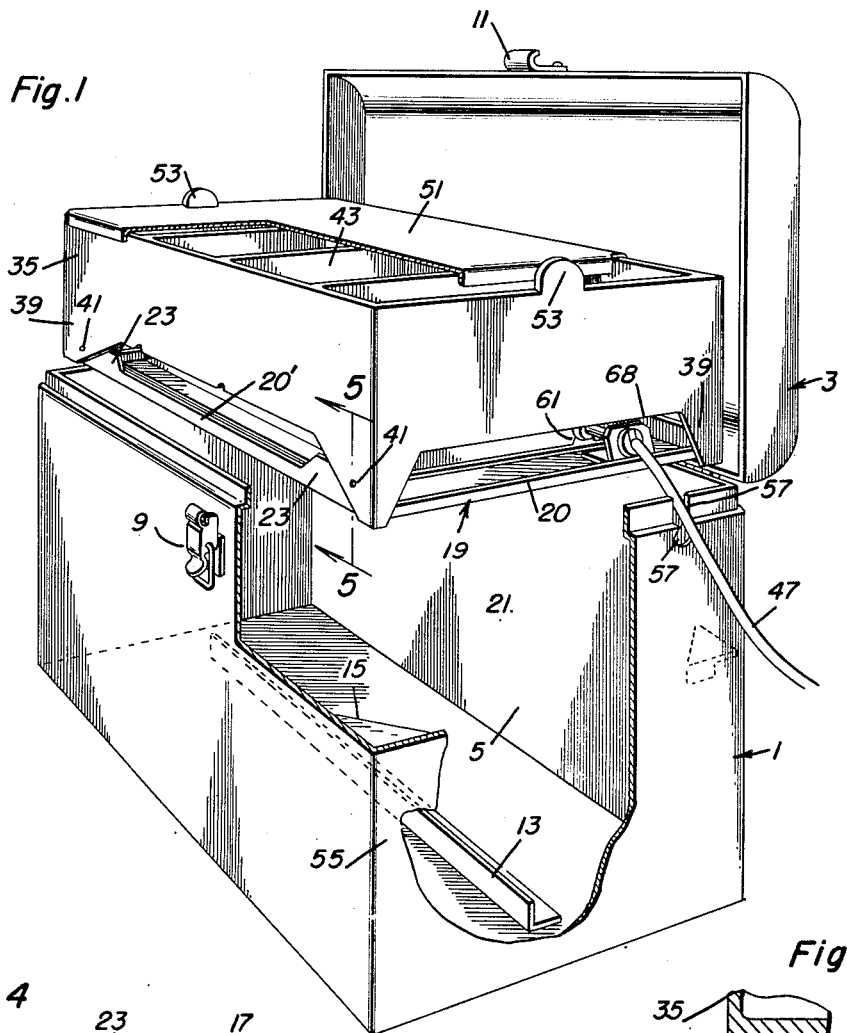
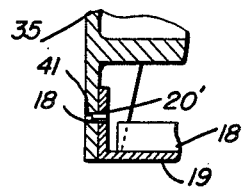
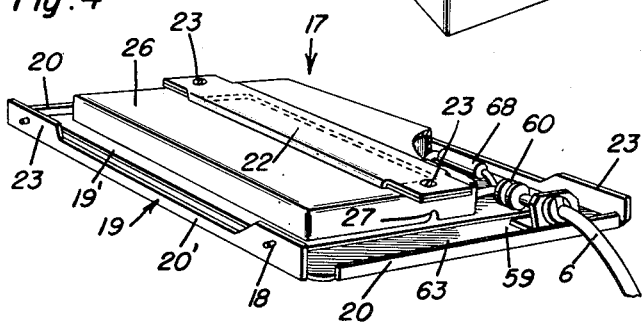
Frank H. Lott
INVENTOR.

March 15, 1955          F. H. LOTT          2,704,319
ELECTRICALLY HEATED LUNCH PAIL
Filed Sept. 29, 1954          2 Sheets-Sheet 2
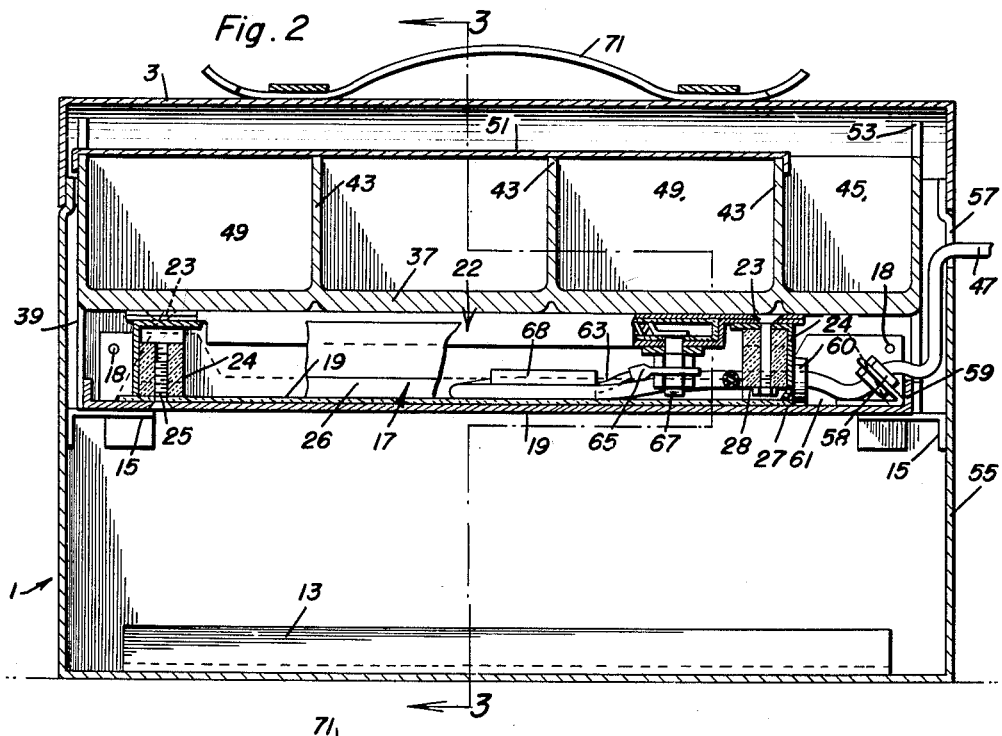
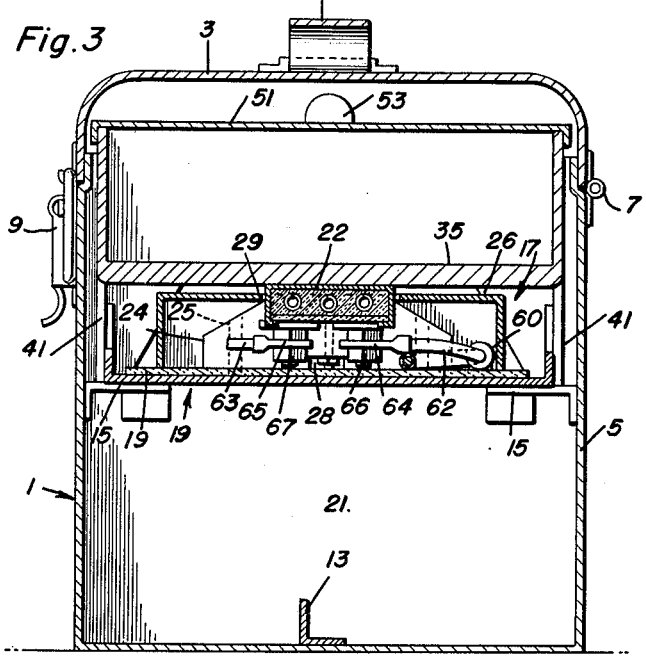
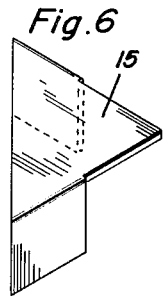
Frank H. Lott
INVENTOR.

United States Patent Office 2,704,319
Patented Mar. 15, 1955

2,704,319

ELECTRICALLY HEATED LUNCH PAIL

Frank H. Lott, Lebanon, Oreg.

Application September 29, 1954, Serial No. 459,091

3 Claims. (Cl. 219—35)

My invention relates to electrically heated lunch pails, or boxes, and is designed as an improvement over the lunch pail forming the subject matter of my U. S. Letters Patent No. 2,611,851, dated September 23, 1952.

The primary object of this invention is to provide in such a lunch pail electrical heating means for heating the contents of a top tray in the pail, while keeping a bottom compartment therein cool, in a more efficient manner than in the pail of my aforesaid patent, and at the same time provide for more space in the tray.

Another object is to provide in the pail a heating unit attached to the bottom of the tray for detachment so that the pail can be used without heating means, if desired.

Still another object is to simplify the construction and reduce the cost of manufacture of the pail.

Other and subordinate objects together with the precise nature of my improvements will become readily apparent when the following description and claims are read with reference to the drawings accompanying and forming part of this specification.

In said drawings:

Figure 1 is a perspective view partly broken away and shown in section of my improved pail with the tray and heating unit raised out of the body section of the pail;

Figure 2 is a view in vertical longitudinal section of the pail;

Figure 3 is a view in vertical transverse section taken on the line 3—3 of Figure 2;

Figure 4 is a view in perspective of the heating unit detached and drawn to a smaller scale;

Figure 5 is an enlarged detail view in vertical section taken on the line 5—5 of Figure 1; and Figure 6 is an enlarged view in perspective of one of the tray supports.

Referring to the drawings by numerals, the pail comprises a rectangular bottom body section 1, and a trunk type lid 3 hinged to one side 5 of the body section 1, as at 7, and adapted to be locked closed by a conventional latch 9 on the other side of the body section 1 engageable with a conventional keeper 11 on the lid 3. A longitudinal bottom bar 13 in the body section 1 provides for separating articles placed in said section. Horizontal triangular supports 15 provided in the corners of the body section 1 at a suitable distance below the top of said section support a heating unit designated generally by the numeral 17.

The heating unit 17 comprises a rectangular heat deflecting plate 19 slightly shorter and narrower than the section 1 and adapted to rest on the supports 15 to form a bottom food containing compartment 21 in the body portion 1. The plate 19 is provided at its longitudinal edges with upstanding flexible corner ears 23 having outstanding studs 18 formed thereon for a purpose presently seen. Upstanding end and side flanges 20, 20' on the plate 19 reinforce the same.

An elongated heating element 22 extends longitudinally over the plate 19 in the longitudinal center thereof and which is flat and insulated. The heating element 22 is secured to and spaced above said plate 19 by bolts 23 fastening the ends of said element on bars 24 spacing the element above said plate 19 and extending transversely of said plate 19 with screws 25 securing said bars 24 on said plate 19. An asbestos heat insulating sheet 19' on said plate 19 on which said bars 24 seat and which underlies the heating element 22 and is secured in place by the screws 25 reduces heat transfer downwardly through the plate 19.

A rectangular box type cover 26 is removably seated on the sheet 19' and prevents foreign matter from getting under the heating element 22 while at the same time covering and protecting lead wire electrical connections, presently described, to the heating element 22. The cover 26 fits over the bars 24 and is held down by overlying ends of the heating element 22 and centered relative to element 22 by inturned end lugs 27 bent into notches 28 in the bars 24. The heating element 22 between its ends depends part way, with a slight clearance through a longitudinal central slot 29 in said cover for protection by said cover 26 and to extend upwardly above the cover.

The tray 35 is rectangular and of substantially the same size as the plate 19 with a bottom 37 and short depending corner legs 39. The legs 39 fit over the ears 23 and are provided with apertures 41 adapted for interlocking engagement with the studs 18 to form snap fasteners detachably securing the plate 19 and tray 35 together with the bottom of the tray 35 resting on the heating element 22, and the tray 35 thus spaced above said plate 19. Transverse partitions 43 divide the tray 35 into a relatively narrow end compartment 45, for containing an electric plug-in cable 47 under conditions presently described, and other wider compartments 49 for food. A removable flanged lid 51 covers the tray 35 over the compartments 49. Upstanding end tabs 53 on said tray 35 are provided for grasping by the hands to lift the tray 35 and heating unit 17 out of the body section 1.

The tray 35 and heating unit 17 are adapted to be positioned in the body section 1 with the ends of said tray and deflecting plate 19 spaced from the ends of the body 1 and with the narrow end compartment 45 of said tray opposite an end 55 of said section 1 provided with a downwardly extending top edge notch 57 therein.

The plug-in cable 47 when in use is extended out of the section 1 by way of the notch 57 and is anchored to the plate 19 adjacent one end of said plate by a split clamping grommet 58 suitably fixed in an angle bracket 59 secured on said tray, the arrangement being such that said grommet 58 and bracket 59 securely hold said cable 47 to the plate 19. From the grommet 58, the cable 47 passes into the cover 26 through a grooved insulation grommet 60 fitting upwardly in a bottom notch 61 in one end of the cover 26 and removable out of said notch 61 when the cover 26 is removed. The usual lead wires 62, 63 of the cable are extended within the cover 26 with terminals 64, 65 connected to binding posts 66, 67 on one end of the heating element 22. The wire 63 constituting the input wire has a suitable rheostat 68 interposed therein.

A conventional handle 71 is provided on the lid section 3.

In using the described pail, the compartments 49 may be used as heating or cooking chambers in the body section 1. As will be noted, the heating unit 17 is spaced below the tray 35 with the exception of the heating element 22 on which the tray 35 rests and the tray 35 and deflecting plate 19 are spaced from the ends and sides of the body section 1. Also, the lid section 3 when closed is spaced above the tray 35. By this arrangement, heat generated by the heating element 22 can circulate around the tray and above the food compartment 21 to heat food in the tray compartments 49 to maintain the same hot or to cook the same without heating food in the compartment 21.

The tray 35 and heating unit 17 may be removed out of the body section 1 and used as a separate cooker. By flexing the ears 23 inwardly, the tray may be detached from the heating unit, the latter may be removed from the body section 1, and the tray 35 used in said section with the heating of food dispensed with.

Preparatory to carrying the pail, the lid section 3 may be raised, and the plug-in cable folded into the compartment 45 and the lid section 3 closed and locked so that said line may be transported in a protected position.

The foregoing will, it is believed, suffice to impart a clear understanding of my invention without further explanation.

Manifestly, the invention is susceptible of modification without departing from the inventive concept and right is herein reserved to such as fall within the scope of the invention as herein disclosed.

What I claim is:

1. In an electrically heated lunch pail, having a bottom body section forming a food compartment, and a closure lid for said body section, a tray in the upper portion of said body section having food containing compartments therein, an electrical heating unit below said tray including a bottom heat deflecting plate and an electric heating element surmounting and secured to said plate, corner brackets in said body section supporting said plate and from which said plate is removable for removal of said heating unit out of the body section, corner legs on said tray, and releasable snap fastener means on said legs and plate detachably attaching said tray to said plate for detachment when said plate is removed, said tray fitting on said supports for use while detached from said plate, said legs and means spacing said tray from said plate for escape of heat from said heating element from below said tray.

2. A lunch pail as in claim 1, said heating unit and tray being spaced from said body section and said tray being spaced from said lid for circulation of the escaped heat upwardly and over said tray.

3. A lunch pail as in claim 1, and a detachable cover plate for the compartments in said tray.

References Cited in the file of this patent

UNITED STATES PATENTS

| | | |
|---|---|---|
| 2,251,582 | White | Aug. 5, 1941 |
| 2,513,218 | Turnipseed | June 27, 1950 |
| 2,577,870 | Aston | Dec. 11, 1951 |
| 2,611,851 | Lott | Sept. 23, 1952 |
| 2,690,497 | Wiggins | Sept. 28, 1954 |